United States Patent [19]

Levy

[11] 4,335,069
[45] Jun. 15, 1982

[54] FLAT SHEET PROCESS FOR PRODUCTION OF POLYOLEFIN SHRINK FILM

[75] Inventor: Stanley B. Levy, Wilmington, Del.

[73] Assignee: E. I. Du Pont de Nemours and Company, Wilmington, Del.

[21] Appl. No.: 278,434

[22] Filed: Jun. 25, 1981

[51] Int. Cl.³ ............................................. B29C 17/02
[52] U.S. Cl. .................................................. 264/290.2
[58] Field of Search ........................... 264/290.2, 210.7

[56] References Cited

U.S. PATENT DOCUMENTS

| | | | |
|---|---|---|---|
| 2,995,779 | 5/1961 | Winter. | |
| 3,144,399 | 8/1964 | Rainer et al. | 204/154 |
| 3,212,073 | 11/1965 | Olson et al. | 264/178 |
| 3,271,495 | 9/1966 | Gronholz et al. | 264/210 |
| 3,324,218 | 6/1967 | Gebler et al. | 264/210.7 |
| 3,383,445 | 5/1968 | Gebler et al. | 264/95 |
| 3,551,540 | 12/1970 | Pellicciari et al. | 264/89 |
| 3,551,546 | 12/1970 | Gosper et al. | 264/178 |
| 3,676,539 | 7/1972 | Fisher | 264/175 |
| 3,891,737 | 6/1975 | Marsh et al. | 264/95 |
| 4,277,594 | 7/1981 | Matthews et al. | 526/352 |

FOREIGN PATENT DOCUMENTS 914411 11/1959 United Kingdom.

*Primary Examiner*—James B. Lowe

[57] ABSTRACT

A balanced, biaxially oriented polyolefin shrink film is produced using a tenter process by heating the film, stretching the film 7 to 10 times in the transverse direction, cooling the film and then heating and stretching the film 1.5 to 4 times in the longitudinal direction such that the ratio of the transverse stretch to the longitudinal stretch is greater than 2.0.

5 Claims, No Drawings

FLAT SHEET PROCESS FOR PRODUCTION OF POLYOLEFIN SHRINK FILM

BACKGROUND OF THE INVENTION

The subject invention relates to the manufacture of polyolefin shrink film using a flat sheet process.

The manufacture of biaxially oriented, heat set polypropylene film using a conventional flat sheet process is well known in the art. An extruded polypropylene web is heated and stretched in the machine direction and subsequently stretched in the transverse direction (MD-TD) and heat set. This orientation improves the film's strength, clarity and gauge uniformity. Similarly, polyesters such as polyethylene terephthalate have been extruded in flat sheet form and biaxially oriented to improve the mechanical properties of the resulting dimensionally stable film; the sequence of orientation here has also been of the MD-TD type.

In contrast, the manufacture of biaxially oriented polyolefin shrink film has most commonly been carried out using a tubular extrusion process. An extruded polyolefin tube is expanded by increasing the pressure inside the tube to stretch the walls of the tube, hence, orienting the film in the transverse direction. Simultaneously, the film is stretched in the longitudinal direction to complete the biaxial orientation of the film.

This tubular process has heretofore been preferred over the flat sheet process for the manufacture of polyolefin shrink film because balanced shrinkage via any flat sheet process was unobtainable. However, limitations such as to inability to manufacture less than about 60 gauge film and film-gauge nonuniformities are prevalent in the tubular extrusion process.

SUMMARY OF THE INVENTION

It has now been discovered that under properly selected conditions, the manufacture of balanced polyolefin shrink film can be achieved using a flat sheet process with sequential TD-MD orientation, as opposed to the more standard MD-TD process. This process overcomes the limitations of the tubular process described above.

More specifically, a process for manufacturing biaxially oriented polyolefin film with substantially balanced shrinkage of about 45 to 65 percent at about 120° C. to 140° C. and a shrink force of $6.9 \times 10^5$ to $1.4 \times 10^6$ pascal has been discovered comprising the sequential steps of: conducting a previously extruded and quenched flat film web of polyolefin of an indefinite length along a predetermined treatment path; heating a portion of the web in the path substantially evenly to a temperature at least 10° C. above the polyolefin's line drawing temperature while not exceeding the polyolefin's crystalline melt temperature; transversely stretching the heated web to a width of from 7 to 10 times the width of the unstretched web; cooling the web to a temperature below which the web is subject to shrinkage while holding the web in the transverse stretch; heating the web substantially evenly to a temperature at or above the polyolefin's line drawing temperature while not exceeding the polyolefin's crystalline melt temperature; longitudinally stretching the web 1.5 to 4 times the length of the unstretched web so that the ratio of the transverse stretch to the longitudinal stretch is at least 2.0; cooling the web to a temperature below which the web is subject to shrinkage while holding the web in the longitudinal stretch.

DETAILED DESCRIPTION OF THE PREFERRED EMBODIMENT

In order to attain a balanced biaxially oriented polyolefin shrink film using a flat sheet or tenter manufacturing process, the subject invention requires that the film be oriented under carefully chosen conditions first in the transverse direction and subsequently in the longitudinal, or machine direction (TD/MD orientation). The desired end product of the invention is a film with a balanced shrinkage of about 45 to 65 percent at about 120° C. to 140° C. and a shrink force of between about $6.9 \times 10^3$ and $1.4 \times 10^6$ pascal.

Polyolefin is first extruded and quenched to form a substantially amorphous flat film of an indefinite length. The quenching of the film, well known in the art, improves the physical properties of the film, especially the optical properties, by limiting the formation of spherulites within the polymer's crystalline structure.

As the film is conducted along a predetermined treatment path, a portion of the film is heated substantially evenly to a temperature at least 10° C. above the film's line drawing temperature while not exceeding the film's crystalline melt temperature. The line drawing temperature of the film will depend on the polyolefin being used. Generally speaking, however, the line drawing temperature is defined in the following manner: When a polyolefin film is stretched at temperatures low enough for line drawing, a "line" or "neck" develops in the film perpendicular to the direction of stretch once the yield point is reached. Stretching then emananates from this thinned out region until an elongation equal to the natural draw ratio of the polyolefin is achieved for the particular stretch rate used. If a series of polyolefin film samples is stretched under conditions of line drawing at a set of increasingly higher temperatures (starting from room temperatures, e.g.), a series of decreasingly sharp maxima will result in the corresponding stress-strain curves. At some higher temperature, a maximum no longer appears in the stress-strain curve, and line drawing has ceased. At this temperature or higher temperatures, the film undergoes more uniform stretching over its length and no longer displays a line or neck during elongation. For more detailed discussion of line drawing, refer to U.S. Pat. No. 2,961,711; U.S. Pat. No. 3,057,835; and "Polyethylene" by Renfrew and Morgan, 2nd Edition, pages 170-172, published by Interscience Publishers, Inc., New York (1960). As examples, the line drawing temperature of a blend of 20 to 30 percent high density polyethylene with low density polyethylene is about 95° C. and the line drawing temperature of a copolymer of propylene with less than 2 percent ethylene is about 120° C.

Similarly, the crystalline melt temperature of the polyolefin film will depend on the particular polyolefin being used. For example, a polyolefin comprising a copolymer of propylene and less than 2 percent ethylene has a crystalline melt temperature of about 155° C., and a blend of 20 to 30 percent high density polyethylene with low density polyethylene has a crystalline melt temperature of about 130° C., as does a crosslinked blend of 20 to 30 percent high density polyethylene with low density polyethylene.

Upon attaining the film's stretching temperature, the film is stretched transversely to a width of from about 7 to 10 times the width of the unstretched film. This transverse stretch is conventionally carried out using a tenter oven where the film can be heated and stretched simultaneously. If the polyolefin being used is a blend of 20 to 30 percent high density polyethylene with low density polyethylene, it is preferred that the transverse stretch be carried out while gradually cooling the film to a temperature just above the film's line drawing temperature. The sequential cooling enhances the gauge uniformity of a film of this particular polyolefin blend.

After completing the transverse stretch, the film must be cooled to a temperature below which the film is subject to shrinkage, generally below about 80° C., while holding the film in the transverse stretch. Without this step, the TD shrinkage would be substantially reduced.

Following cooling, the film is again heated substantially evenly to at least the film's line drawing temperature while not exceeding the film's crystalline melting temperature. The heating of the film for the MD stretch need not be as high as that for the TD stretch because of the lower degree of MD stretching to be carried out. For example, a polyolefin comprising a copolymer of propylene and less than 2 percent ethylene, as well as a polyolefin comprising a blend of 20 to 30 percent high density polyethylene with low density polyethylene has a heating range for the MD stretch of about 100° C. to 130° C.

The film is stretched longitudinally 1.5 to 4 times the length of the unstretched film with the additional requirement that the ratio of the transverse stretch to the longitudinal stretch be greater than about 2.0. As is known in the art, longitudinal stretching is preferably carried out using short span machine direction stretchers, thus minimizing neck-in in the transverse direction. The film is then cooled to a temperature below which the film is subject to shrinkage, generally below 80° C., while holding the film in the longitudinal stretch.

Both the sequence of stretching, i.e., TD then MD, and the ratio of TD stretch to MD stretch are critical to the production of a balanced shrink film with acceptable shrink forces. As seen in the comparative examples below, if the sequence of stretching is reversed, either fibrillation of the finished film is evidenced, or the shrink forces are unacceptably low. Further, if the ratio of TD stretch to MD stretch is below 2.0, a highly unbalanced film in the MD direction results.

EXAMPLE 1

A propylene/ethylene copolymer containing 2 percent ethylene was extruded into film form and quenched to about 45° C. The film was conducted along a treatment path at 12.2 m per minute into a tenter oven preheated to about 160° C. The film was stretched transversely 8 times the width of the original film and allowed to cool to 30° C. while holding the film in the transverse stretch. The film was then reheated to about 120° C. and stretched in the longitudinal direction 3.0 times the original length of the film. This longitudinal stretch was achieved by means of a short-span MD stretcher comprising stretch rolls spaced within 0.008 cm of each other, the downstream roll operating at a faster rate than the upstream roll to effect the longitudinal stretching of the film. The film was then cooled to room temperature while holding the film in the longitudinal stretch. In order to measure shrinkage properties, the film was then placed in an oil bath at 140° C. Upon removal from the oil bath, the MD shrinkage was found to be about 65 percent and the TD shrinkage about 50 percent. The shrink forces were about $10^6$ pascal.

EXAMPLE II

A blend of 20 to 30 percent high density polyethylene and low density polyethylene was treated as per Example I with the following modifications: the transverse stretch was 9 times the width of the original film, carried out while cooling the film from an initial temperature of about 150° C. to a temperature of about 100° C. at the end of the TD stretch cycle. The MD stretch was as per the table below displaying corresponding shrinkage data. The shrink forces were all about $10^6$ pascal.

| MD Stretch | SHRINK DATA | | |
|---|---|---|---|
| | Oil Temp. | MD Shrink | TD Shrink |
| 3.0 | 120° C. | 62% | 51% |
| 3.0 | 120° C. | 64% | 53% |
| 3.0 | 120° C. | 60% | 47% |
| 3.5 | 120° C. | 67% | 47% |
| 2.5 | 120° C. | 57% | 47% |

COMPARATIVE EXAMPLE

The polyolefin of Example I was treated under the conditions of Example I except that the stretch sequence was reversed, i.e., first the film was stretched longitudinally 4.5 times the original length of the film, cooled, and then stretched transversely 7.0 times the original width of the film. The resulting shrinkages were highly unbalanced in the TD direction, the MD shrinkage being about 10% and the TD shrinkage being about 65%.

In an attempt to overcompensate for the unbalanced shrinkage above, the same procedure was followed except the longitudinal stretch was increased to 7.0 times the length of the original film and the transverse stretch was reduced to 2.0 times the width of the original film. The resulting shrinkages were balanced, but unacceptably low, i.e., 19% in the MD direction and 21% in the TD direction and the film was very susceptible to MD fibrillation.

I claim:
1. A process for manufacturing biaxially oriented polyolefin film with substantially balanced shrinkage of 45 to 65 percent at 120° C. to 140° C. and a shrink force of about $6.9 \times 10^5$ to $1.4 \times 10^6$ pascal comprising the sequential steps of:
   (i) conducting a previously extruded and quenched flat polyolefin film of an indefinite length along a predetermined treatment path;
   (ii) heating a portion of the film in the path substantially evenly to a temperature at least 10° C. above the film's line drawing temperature while not exceeding the film's crystalline melt temperature;
   (iii) transversely stretching the heated film to a width of from 7 to 10 times the width of the unstretched film;
   (iv) cooling the film to a temperature below which the film is subject to shrinkage while holding the film in the transverse stretch of step (iii);
   (v) heating the film substantially evenly to a temperature at least equal to the film's line drawing temperature while not exceeding the film's crystalline melt temperature;
   (vi) longitudinally stretching the film 1.5 to 4 times the length of the unstretched film so that the ratio of the transverse stretch of step (iii) to the longitudinal stretch is at least 2.0;

(vii) cooling the film to a temperature below which the film is subject to shrinkage while holding the film in the longitudinal stretch of step (vi).

2. The process of claim 1 wherein the polyolefin is a blend of 20 to 30 percent high density polyethylene with low density polyethylene; and the transverse stretch of step (iii) is carried out while gradually cooling the film to a temperature just above the film's line drawing temperature.

3. The process of claim 1 wherein the polyolefin is a copolymer of propylene and less than 2 percent ethylene.

4. The process of claim 2 or 3 wherein the heating of the film of step (ii) is to a temperature of 130° C. to 180° C.

5. The process of claim 2 or 3 wherein the heating of the film of step (v) is to a temperature of 100° C. to 130° C.

* * * * *